United States Patent

[11] 3,623,683

| [72] | Inventor | William B. Bennett<br>1525 N.E. 149th St., North Miami, Fla. 33161 |
|---|---|---|
| [21] | Appl. No. | 62,805 |
| [22] | Filed | Aug. 11, 1970 |
| [45] | Patented | Nov. 30, 1971 |

[54] UNDERSEAT LIFE SAVING EQUIPMENT CONTAINER FOR AIRCRAFT
7 Claims, 5 Drawing Figs.

[52] U.S. Cl. ............................................. 244/122,
297/192, 206/19.5
[51] Int. Cl. .................................................. B64d 25/04
[50] Field of Search........................................ 244/122,
122 A; 297/192; 296/37, 63; 206/19.5 R, 19.5 B;
9/12; 114/190

[56] References Cited
UNITED STATES PATENTS
2,748,841 6/1956 Rimkus ........................ 297/192

| 2,931,550 | 4/1960 | Wood | 206/19.5 X |
|---|---|---|---|
| 3,131,813 | 5/1964 | Jensen | 297/192 X |
| 3,516,098 | 6/1970 | O'Link | 244/122 X |

*Primary Examiner*—Milton Buchler
*Assistant Examiner*—Carl A. Rutledge
*Attorney*—Ernest H Schmidt ABSTRACT: A novel life-saving equipment container for use with passenger chairs of the type used in commercial aircraft, including means for its removable attachment close up against the underside of the chair seat. The attachment means is in the form of front-to-back guide tracks affixed to the underside of the seat and cooperative with a shallow equipment container drawer having forwardly extending handle means conveniently accessible to a seated passenger for withdrawal of the container drawer preparatory for use of the life-saving equipment. The handle comprises a forwardly extending part of a flat cover member adapted to hermetically seal the life-saving equipment in the drawer prior to use of the equipment.

PATENTED NOV 30 1971
3,623,683
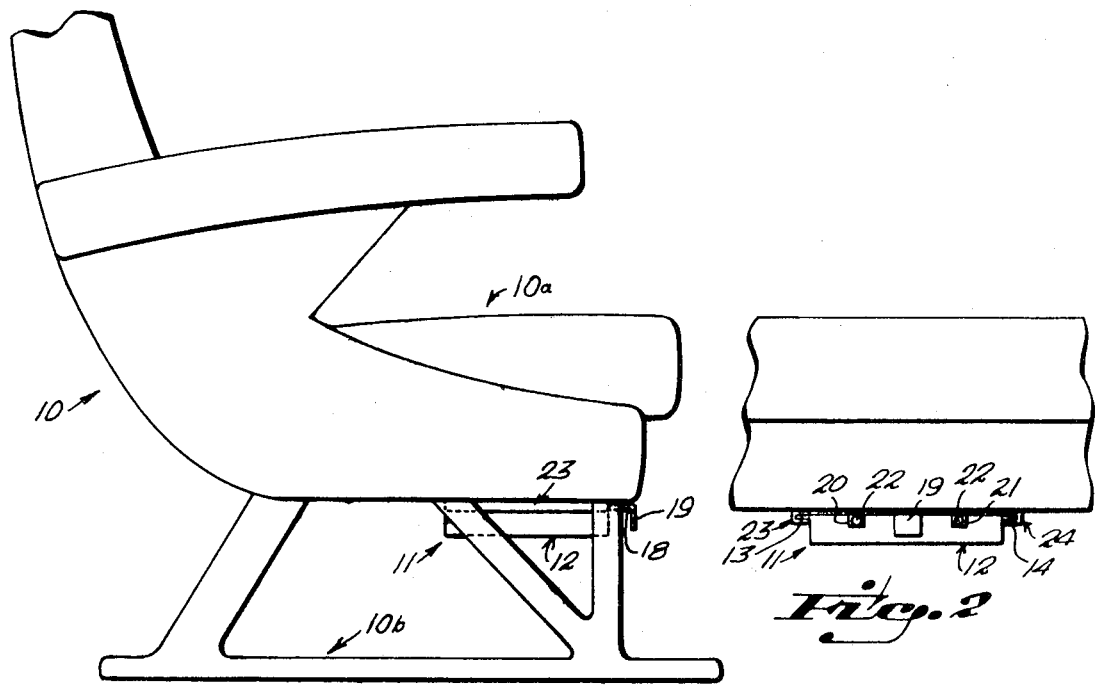
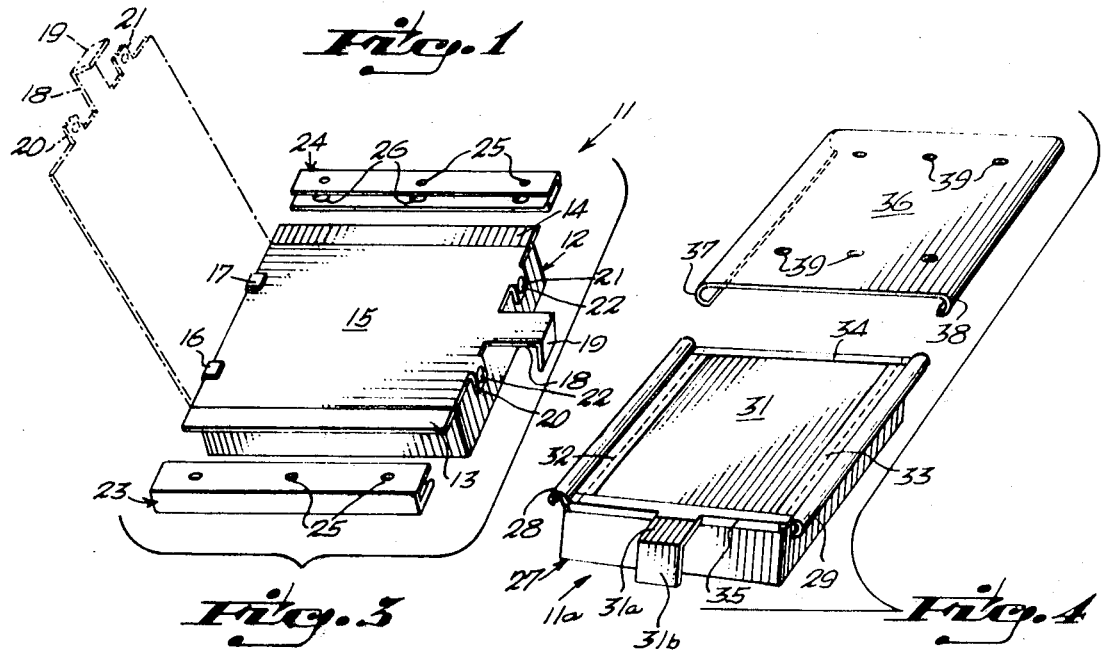
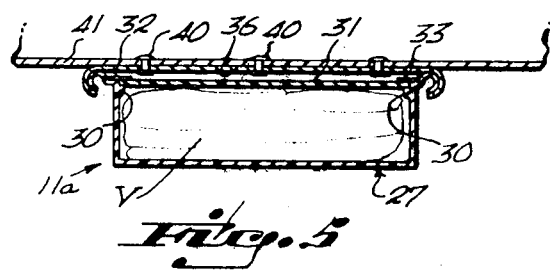
INVENTOR.
WILLIAM B. BENNETT
BY Ernest H. Schmidt
ATTORNEY.

UNDERSEAT LIFE SAVING EQUIPMENT CONTAINER FOR AIRCRAFT

This invention relates to life vests for emergency use, particularly for application in commercial passenger aircraft flying over water. It is presently common practice to equip commercial airliners with inflatable life vests for use by passengers in the event that the aircraft is forced down or "ditched" in water. Such inflatable life vests as have heretofore been devised and used, however, have been stowed under the seat. With the continuous increase in size of airliners and more compact seat arrangement and structure for greater passenger carrying capacity, the space remaining under the seats and the front-to-back spacing between the seats has become smaller and smaller. This fact, coupled with the practice of passengers placing brief cases, smaller articles of luggage and the like between seat rows close to their seats has made it increasingly difficult for them to reach under their seats to extricate their particular life vest. When under the tress of an actual emergency, the chaotic conditions arising because of passengers being unable to extricate their particular life vest could prove disastrous.

It is, accordingly, the principal object of this invention to obviate the above-described difficulties and deficiencies in life-saving equipment stowage, particularly on passenger aircraft flying over water.

A more particular object is to provide, for use in association with a passenger seat chair, an underseat life saving equipment container that is removably fitted close up against the underside of the passenger seat and which can readily be removed and open by the seat occupant to furnish his life-saving equipment, such as an inflatable life vest, during an emergency.

It is a more particular object of the invention to provide a life-saving equipment container of the character above described wherein the equipment container of the character above described wherein the equipment container is in the form of a shallow drawer slidingly received in front-to-back guide track means affixed to the underside of the aircraft seat, the drawer being so shallow and thereby occupying so little of the space under the chair as to minimize any obstruction to the use of the remainder of the underseat space for the stowage or temporary placement of briefcase, smaller cases of luggage and the like.

Another object of the invention is to provide an equipment container of the above nature having readily a removable cover for the equipment drawer, so arranged and adapted as to be readily hermetically sealed with respect to the container for preserving the contained life-saving equipment against the damaging effects of atmospheric moisture over long periods of nonuse.

Yet another object of the invention is to provide an equipment container of the above nature wherein the cover member comprises a forwardly extending handle by means of which the container can readily be pulled forwardly out of its underseat position for use by the seat occupant, and wherein said cover member handle further serves as a hand grip for separating the cover member from its receptacle drawer to expose the contained life saving equipment, whereby the whole operation can be simply and expeditiously carried out with a minimum of effort.

Yet another object of the invention is to provide an underseat life saving equipment container for aircraft that can readily and inexpensively be applied to existing aircraft chair structures and which will be economical to manufacture, readily replacable for safety and inspection purposes, and efficient, durable, and inconspicuous in use.

Other objects, features, and advantages of the invention will be apparent from the following description when read with reference to the accompanying drawings. In the drawings, wherein like reference numerals denote corresponding parts throughout the several views:

FIG. 1 illustrates, in side elevation, an aircraft seat equipped with an underseat life saving equipment container embodying the invention;

FIG. 2 is a partial front elevational view of the aircraft seat shown in FIG. 1;

FIG. 3 is an oblique view, as seen from above, of the container illustrated in FIGS. 1 and 2, shown separately and in "exploded" relation with respect to the support tracts;

FIG. 4 is an oblique view, as seen from above, of a modified form of equipment container embodying the invention, shown in withdrawn position with respect to the sliding support member; and FIG. 5 is a transverse cross-sectional view of the embodiment of the invention illustrated in FIG. 4, shown assembled to the bottom panel of an aircraft seat.

Referring now in detail to the drawings, reference numeral 10 in FIG. 1 designates, generally, a typical chair or seat structure of a type used in commercial airliners, the same being comprised of a seat portion 10a supported in spaced relation above the floor of the aircraft such as by a pair of laterally spaced leg framework members 10b (only one shown) defining floor-to-seat space therebetween which is ordinarily used for storage of smaller articles of passenger baggage along with loosely stowed life-saving emergency equipment such as inflatable life vests. The present invention relates to the improvement of such chair seats by the provision of a life-saving equipment container attached at the underside thereof, the container being of such construction and so arranged for easy withdrawal as to be readily accessible in an emergency with little effort and without obstruction by passenger baggage placed under the seat.

As illustrated in FIGS. 1, 2 and 3, the underseat life saving equipment container, indicated generally by reference numeral 11, comprises a shallow, open-topped, rectangular receptacle drawer 12, the longitudinal sides of which are formed at their upper ends with sidewardly outwardly extending longitudinal flanges 13 and 14. A rectangular flat cover member 15 is provided for enclosing the top opening of the drawer member 12, said cover member preferably being hingedly attached along the rear edge as by hinges 16 and 17. The front of the cover member 15 is integrally formed with a central, forwardly extending handle member 18 having a downturned outer portion 19. Flexible tabs 20 and 21 extend forwardly of the front edge of the cover member 15 at each side of the handle 18, said tabs each being fitted with a snap fastener 22 for releasable attachment to complimentary snap-fitting members (not illustrated) secured to the front wall of the container 11, (see FIG. 3).

As further illustrated in FIGS. 1, 2 and 3, the underside of the seat portion 10a of the aircraft chair 10 has secured thereto, in spaced parallel relation, a pair of forwardly extending slide channels 23, 24, of U-shaped cross-sectional configuration with the open sides facing one another and so spaced as to provide guide tracks for slidingly receiving the sidewardly outwardly extending flanges 13, 14 of the rectangular receptacle drawer 12. The slide channels 23 and 24 are preferably provided along their lengths with upper screw holes 25 and lower aligned access holes 26 of comparatively increased diameter to facilitate attachment to the underside of the chair seat 10a (see FIG. 3).

FIGS. 4 and 5 illustrate the modified form of life saving equipment container 11a comprising a shallow, open-topped, rectangular receptacle drawer 27, the longitudinal side of which are formed at their upper ends with upwardly and outwardly directed arcuate beads 28, 29. The inside of the drawer 12, near its upper end, is formed with a short, inwardly directed, peripheral projection defining a slightly recessed peripheral shoulder 30 adapted to seat a flat, rectangular cover member 31, having a forwardly projected handle member 31a terminating in a turned-down finger grip portion 31b. The receptacle drawer 27 and its flat cover member 31 are preferably integrally molded of a tough synthetic plastic material for economy of manufacture and of purposes of hermetically sealing the equipment container. As best illustrated in FIG. 4, the receptacle drawer 27 containing life preserving equipment such as a life vest, designated V in FIG. 5, is sealed against the entrance of dust and moisture by the application of pressure-sensitive sealing strips 32, 33, 34 and 35 along the marginal juncture zones between the flat cover member 31 and the receptacle drawer 27.

Means is provided for slidingly receiving and retaining the equipment container 11a in close-fitting disposition against the underside of a typical aircraft seat structure. To this end, a substantially rectangular container support member 36 is provided, said support member preferably being of sheet metal formed along its length, from front to back, with opposed, downwardly turned, arcuate side portions 37 and 38, defining complemental tracks for the sliding reception of the opposed arcuate beads 28, 29 of the equipment container 11a (see FIG. 5). The container support member 36 is preferably provided with a plurality of holes 39 for the reception of rivets 40 by means of which it may be conveniently attached up against the bottom panel 41 (partially illustrated in FIG. 5) of the aircraft seat structure to which the device is applied.

In use, it is a simple matter of the seat occupant to reach down and slidingly pull out the equipment container 11 (or 11a) without leaving the seat, thereby minimizing any possibility of interfering with the like emergency preparations of an adjacent seat occupant. Once removed, it is a simple matter to remove the cover to expose life preserving equipment, such as a life vest V, either by unsnapping and lifting the flat cover member 15 as in the embodiment of FIGS. 1, 2 and 3, or by pulling sharply upwardly upon the handle 31a, 31b to disengage the pressure-sensitive sealing strips 32 through 35 in the embodiment of the invention illustrated in FIGS. 4 and 5. In the use of the equipment containers, it will be noted that they are so shallow in height, and so closely fitted to the underside of the chair seat structure, as to be readily accessible even if the remaining space under the chair is packed with smaller articles of luggage, handbags and the like of the seat occupant. It is further to be noted that the container structure is such as lends itself well to hermetical sealing, such as by the use of the pressure-sensitive sealing strips 32 through 35 in the embodiment of the invention illustrated in FIGS. 4 and 5, whereby any deterioration of the contained life saving or life preserving equipment over long periods of nonuse will be kept to an absolute minimum. The container system embodying the invention is also particularly well adapted to preventive maintenance procedures wherein newly inspected equipment containers are used to replace those in service after periodic intervals with a minimum of aircraft out-of-service time.

While I have illustrated and described herein only two forms in which my invention can conveniently be embodied in practice, it is to be understood that these forms are given by way of example only and not in a limiting sense. The invention, in brief, comprises all the embodiments and modifications coming within the scope and spirit of the following claims.

What I claim as new and desire to secure by Letters Patent is:

1. In a life saving equipment container for use in association with an aircraft passenger chair of the type having a seat supported in spaced relation with respect to the aircraft floor, the combination comprising, a substantially rectangular, comparatively shallow receptacle drawer adapted to contain life-saving equipment, means for removably attaching said receptacle drawer up against the underside of an aircraft chair seat, said attaching means comprising guide track mechanism constraining said receptacle drawer to in-and-out front-to-back sliding movement, a cover member removably attached to the top of said receptacle drawer for the protection of life-saving equipment contained therein, and handle means extending forwardly of said receptacle drawer and facilitating the forward withdrawal thereof from said guide track mechanism.

2. A life saving equipment container as defined in claim 1, wherein said handle means is integrally formed with said cove member.

3. A life-saving equipment container as defined in claim 2, wherein the rear end of said cover member is hingedly connected to the rear end of said equipment drawer.

4. A life-saving equipment container as defined in claim 3, wherein said guide track mechanism comprises a pair of channel members of substantially U-shaped cross-sectional configuration attached in spaced parallel relation along the underside of the chair seat with their open sides in facing relation, and wherein said receptacle drawer comprises, along each side, opposed, sidewardly outwardly extending flanges slidingly receivable in one each of said channel members.

5. A life-saving equipment container as defined in claim 2, wherein said receptacle drawer is formed, at its upper end with an interior peripheral seat for the reception of said cover member, and pressure-sensitive means for sealing the peripheral juncture of said cover member with respect to said receptacle drawer when said cover member is seated on said peripheral seat to hermetically seal life-saving equipment contained within said receptacle drawer.

6. A life-saving equipment container as defined in claim 5, wherein said receptacle drawer and said cover member are each integrally formed of a synthetic plastic material.

7. A life-saving equipment container as defined in claim 6, wherein said guide track mechanism comprises a pair of upwardly and outwardly directed arcuate beads formed one along each side of said receptacle drawer at opposed upper end portions thereof, and a container support member attached to the underside of the chair seat and being provided along each side with spaced, parallel, downwardly extending arcuate side portions complemental in shape to said arcuate beads.

* * * * *